July 4, 1967   P. TASHMAN   3,329,253
BELT CONVEYOR
Filed Sept. 27, 1965   3 Sheets-Sheet 1
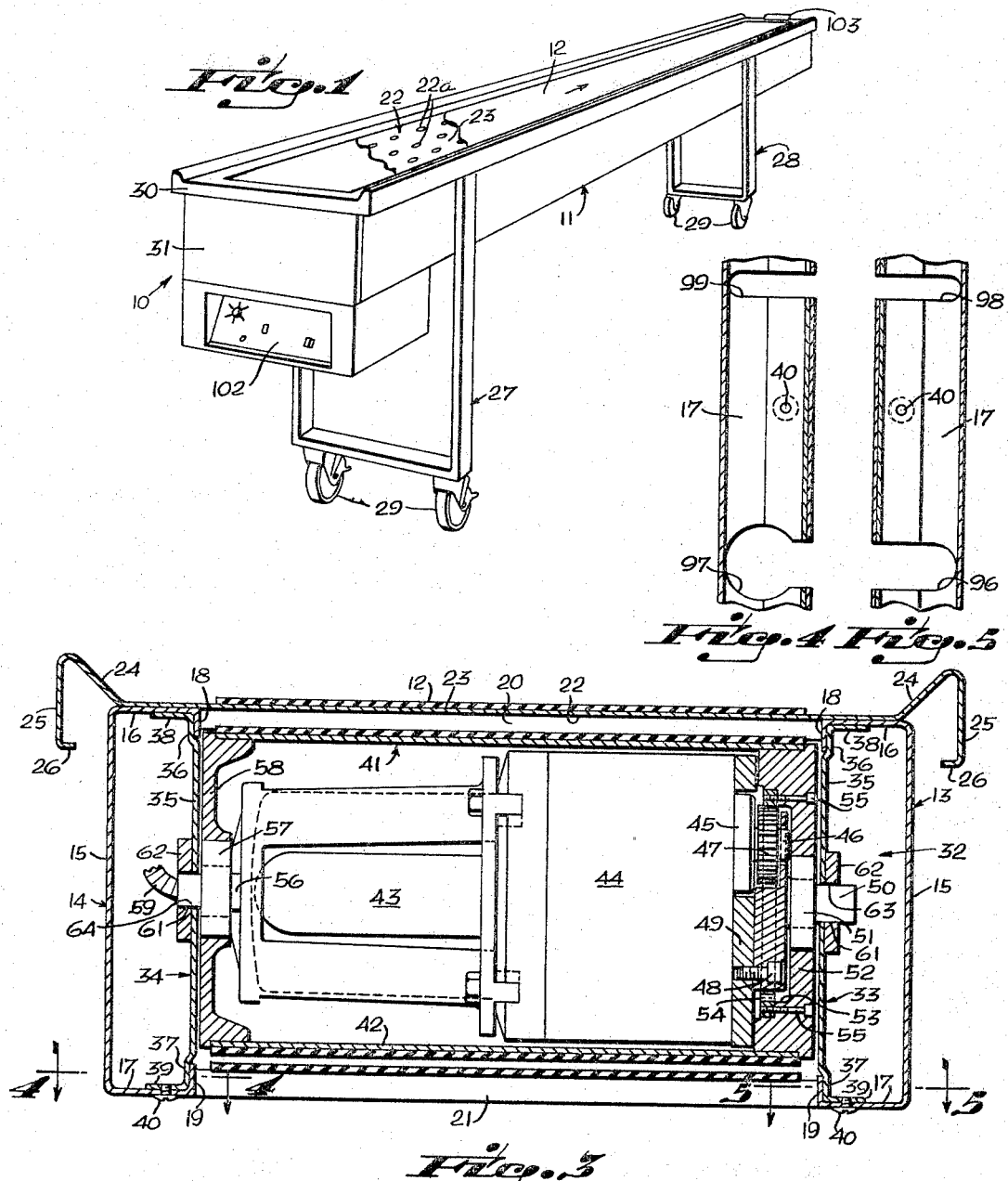
INVENTOR.
PHILIP TASHMAN
BY E. H. Schmidt
ATTORNEY.

July 4, 1967
P. TASHMAN
3,329,253
BELT CONVEYOR
Filed Sept. 27, 1965
3 Sheets-Sheet 2
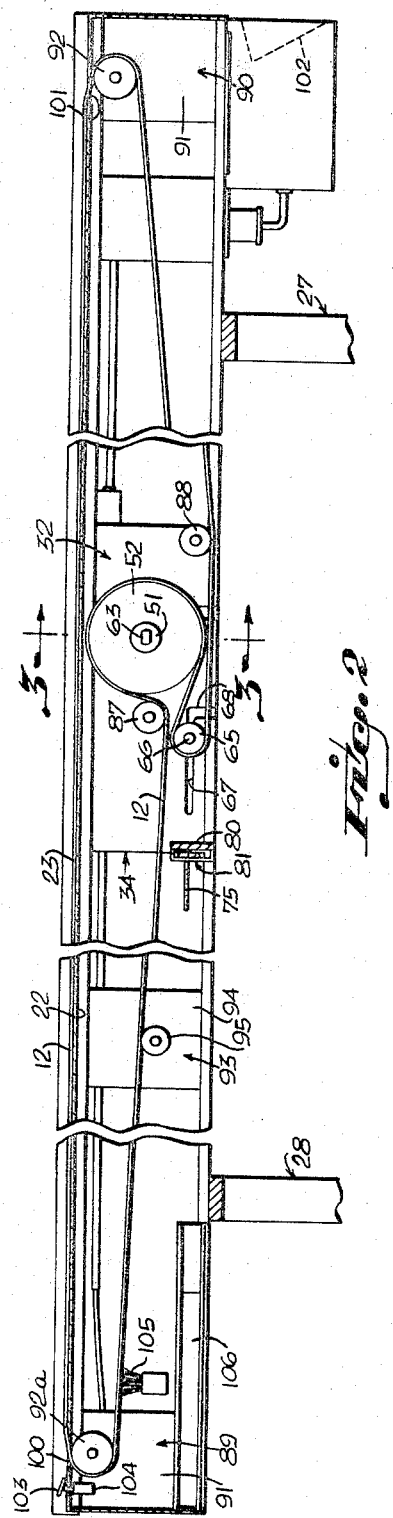
INVENTOR.
PHILIP TASHMAN
BY E. H. Schmidt
ATTORNEY.

July 4, 1967  P. TASHMAN  3,329,253
BELT CONVEYOR

Filed Sept. 27, 1965  3 Sheets-Sheet 3

INVENTOR.
PHILIP TASHMAN
BY E. H. Schmidt
ATTORNEY.

United States Patent Office 3,329,253
Patented July 4, 1967

3,329,253
BELT CONVEYOR
Philip Tashman, 4800 Ronda, Coral Gables, Fla. 33146
Filed Sept. 27, 1965, Ser. No. 490,560
4 Claims. (Cl. 198—108)

This invention relates generally to belt conveyors and is directed particularly to improvements in belt conveyors of the type used for conveying food trays, dishes and the like between remote areas, such as, for example, a central kitchen and one or more dining areas in hospitals, institutions and cafeterias.

The principal object of the invention is to provide a belt conveyor system including basic belt drive and belt guidance units that can be universally installed in conveyor frameworks of various lengths and designs, thereby to simplify and effect substantial cost reduction over the former practice of custom installation of an entire conveyor system to meet individual length and design requirements.

A more particular object is to provide, as a drive unit for belt conveyors, a variable speed drive drum having its electric drive motor and gear reduction mechanism sealed within the drum, and a mounting framework for the drive drum removably receivable in a conveyor framework and including idler rollers and a tension roller, and adjustment means for the tension roller to provide for adjustment of belt tension when the drive unit is installed in a conveyor framework.

Another object is to provide, as an adjunct to the drive unit for use in combination therewith in a conveyor framework, end rollers and idler rollers, each in individual support structures removably receivable in the conveyor framework.

Still another object is to provide a belt conveyor system of the above nature which, despite the inclusion of prefabricated belt drive and guide components as standard units for universal use, has the appearance and operating efficiency of a custom-made system for any particular application of a great variety of possible applications.

Yet another object is to provide a belt conveyor system of the character described wherein the drive unit or any one of the end of idler rollers can quickly be replaced, if necessary, to minimize out-of-service time in case of breakdown.

Still another object is to provide a belt conveyor system of the above nature which will be dependable in operation, variable over a wide range with respect to belt travel speed, streamlined and neat in appearance, and easy to clean, adjust, maintain and operate.

Other objects, features and advantages of the invention will be apparent from the following description when read with reference to the accompanying drawings. In the drawings, wherein like reference numerals denote corresponding parts throughout the several views:

FIG. 1 is a perspective view of a belt conveyor system embodying the invention;

FIG. 2 is a side view, with portions of the conveyor framework broken away to show internal structure of a belt conveyor system embodying the invention;

FIG. 3 is a transverse cross-sectional view taken along the line 3—3 of FIG. 2 in the direction of the arrows and illustrating constructional details of the electric drive drum;

FIG. 4 is a transverse cross-sectional view taken along the line 4—4 of FIG. 3 in the direction of the arrows;

FIG. 5 is a transverse cross-sectional view taken along the line 5—5 of FIG. 3 in the direction of the arrows;

FIG. 6 is a top view of the belt drive unit, shown separately;

Figure 7:
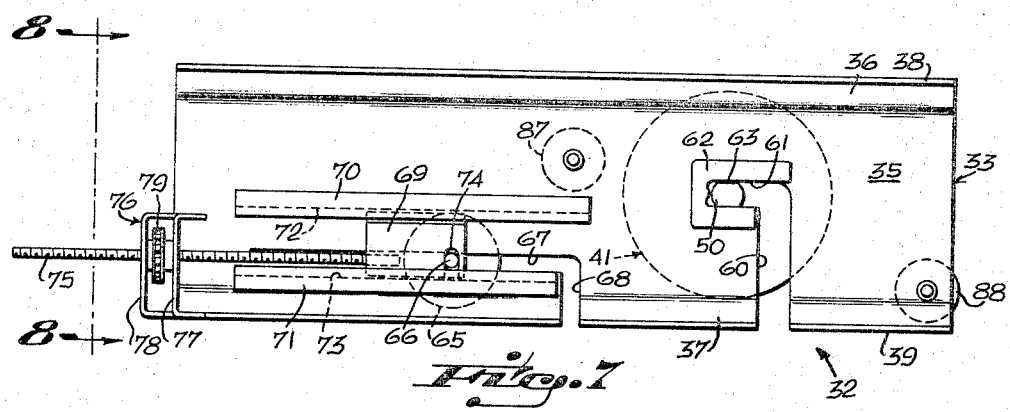
FIG. 7 is a side elevational view of the belt drive unit shown in FIG. 6.

Referring now in detail to the drawings, 10 in FIG. 1 designates a belt conveyor system embodying the invention comprising, generally, an elongated conveyor framework 11 of substantially rectangular cross-section providing an interior chamber enclosing the drive unit, idler rollers and end rollers for powering and guiding an endless belt 12 which travels along the upper or working surface thereof, as hereinbelow more fully described. The framework 11 is comprised of spaced parallel side frame members 13, 14 (see FIG. 3) preferably of sheet stainless steel, formed into U-shaped channels each of which has a vertical side wall portion 15, and upper and lower opposed, parallel horizontal wall portions 16, 17, said upper and lower opposed wall portions terminating in inwardly-directed flange portions 18, 19, respectively. The frame members 13, 14 are secured in spaced parallel relation by means of a first plurality of U-shaped ribs 20 welded transversely in longitudinally-spaced relation along and between the upper flange portions 18 of said frame members, and a second plurality of U-shaped ribs 21 welded transversely in longitudinally-spaced relation along and between the lower flange portions 19 of said frame members. The U-shaped ribs 20 and 21 are preferably fabricated by bending sheet stainless steel into channel shape. The framework 10 further comprises a table top 22 fixed upon and against the upper surfaces of the upper flange portions 18 and integrally formed of stainless sheet steel to provide a flat upper surface portion 23 upon which the belt 12 rides, said upper surface portion preferably being formed along its length with staggered rounded protrusions or raised beads 22a to reduce belt friction. The table top 22 is bounded along each side by integrally-formed, angularly upwardly-extending wall portions 24 extending into downwardly-directed skirt portions 25 terminating in short, inwardly-extending flange portions 26.

The framework 10 is fitted with front and rear support leg members 27 and 28, respectively, which may for example be fitted at their lower ends with caster wheels 29 to facilitate moving the conveyor from place to place, particularly in instances where portability for various uses of the conveyor is desired. End walls 30 (only one shown in FIG. 1) enclose the ends of the table top 22. Rectangular end panels 31 (only one shown in FIG. 1) are removably fitted against the ends of the framework side frame members 13, 14, to provide access to the interior chamber of the conveyor framework for installation of the belt drive unit, the idler roller units, and end roller units, now to be described.

Figure 8:
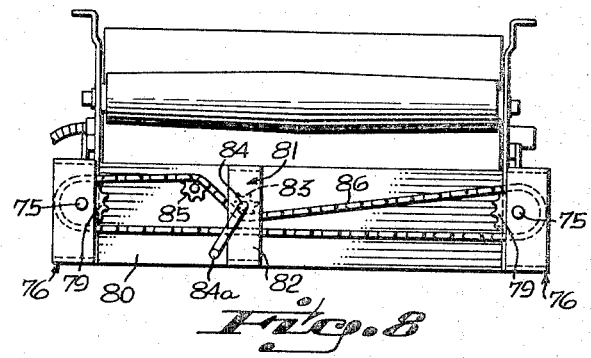
FIG. 8 is a transverse view taken along the line 8—8 of FIG. 7 in the direction of the arrows and illustrating the front end of the drive unit.

The belt drive unit, designated generally by reference numeral 32 in the drawings and illustrated separately in FIGS. 6, 7 and 8, comprises a pair of spaced, parallel mounting channels 33, 34 formed preferably of heavy gauge cold rolled steel. Each of the mounting channels 33, 34 is formed with a flat side wall portion 35, and upper and lower laterally outwardly-offset marginal portions 36, 37, respectively, which terminate in upper and lower outwardly-extending flange portions 38, 39, respectively. As illustrated in FIG. 3 the mounting channels 33, 34 are so shaped and so spaced with respect to each other as to fit slidingly within the conveyor framework 11 with their flange portions 38, 39 in seating engagement against inside portions of the upper and lower horizontal wall portions 16, 17 of the conveyor side frame members 13, 14, and with the inwardly-directed flange portions 18, 19 of said side frame members seated within the recesses defined by the offset marginal portions 36, 37 of said mounting channels. Screws 40 extending trough the undersides of the lower horizontal wall portions 17 of the side frame members 13, 14 (FIG. 3) can be used to secure the belt drive unit in adjusted position within the conveyor framework.

The belt drive unit 32 comprises an electric drum drive unit, generally designated by reference numeral 41, removably received between the mounting channels 33, 34 as is hereinbelow described. The drum drive unit comprises a cylindrical drum 42 which is preferably of stainless steel, concentrically enclosed within which is an electric motor 43 having drivingly-connected therewith at one end a speed reduction gear box 44 having at its outer end an eccentrically located bearing boss 45 journalling a reduced speed output shaft 46 carrying a spur gear 47. The gear box 44 has fixed against its outer end, as by a plurality of machine screws 48 (only one shown in FIG. 3) an axle plate 49 having an outwardly-projecting axle portion 50. An inner end portion of the axle 50 is journalled in a ball bearing unit 51 centrally carried by a circular end plate 52 press-fitted within one end of the drum 42 for rotation in unison therewith. The inside of the end plate 52 is formed with a circular recess 53 within which is seated a ring gear 54 secured in place as by a plurality of machine screws 55 (only two shown in FIG. 3). The ring gear 54 is in mesh with the spur gear 47 on the output shaft of the speed reduction gear box 44.

The outer end of the electric motor 43 is provided with a fixed axial shaft 56 journalled in a ball bearing unit 57 press-fitted within a central opening of a drum end plate 58, the outer periphery of said drum plate being press-fitted within the electric motor end of the cylindrical drum 42. The axial shaft 56 is formed with a central bore through which an electrical cable 59 extends for energizing the electric motor 43. It will thus be apparent that the rotation of the spur gear 47, upon energization of the electric motor 43, serves to rotate the end plate 52 about the axle portion 50 of the axle plate 49, carrying along the cylindrical drum 42, the other end of said drum being journalled with respect to the axial shaft 56.

Means is provided for removably mounting the electric drum drive unit 41 between the mounting channels 33, 34 of the belt drive unit 32, said mounting means comprising a pair of opposed, vertical slots 60 extending upwardly from the lower ends of said channels and terminating in short, forwardly-projecting slot portions 61. As illustrated in FIGS. 3 and 7, outer marginal portions of the slot portions 61 are reinforced by generally J-shaped bars 62 welded or otherwise secured against the outer surfaces of the flat side wall portions 35 of said mounting channels. As illustrated in FIG. 7, the outer ends of the coaxial shafts 50, 56 of the drum drive unit are flattened, as indicated at 63 and 64, respectively, to permit their reception in the forwardly-projecting slot portions 61, said slots thus preventing rotation of said shafts.

The belt drive unit 32 further comprises a belt tension adjustment device comprising a crowned roller 65 arranged between the mounting channels 33, 34 below and forwardly of the drum drive unit 41 (see FIGS. 6 and 7). The crowned roller 65 has axle end portions 66 movable longitudinally in opposed longitudinal slots 67 provided in the channels 33, 34. Opposed vertical slots 68 in the chanels 33, 34 communicate with the rear ends of the longitudinal slots 67 to facilitate assembly and removal of the crowned roller 65.

Means is provided for moving the crowned roller 65 in parallelism with the drum drive unit 41 for adjusting belt tension. To this end a pair of opposed guide plates 69 are provided against the outsides of the channels 33, 34 each guided therealong in covering relation with respect to one of the opposed longitudinal slots 67 as by a pair of upper and lower elongated guide bars 70, 71 formed with opposed recesses 72, 73, respectively, receiving upper and lower marginal portions of said guide plates. The guide plates 69 are each provided with a slot 74 received within which are the crowned roller axle end portions 66. Welded or otherwise affixed to the front ends of the guide plates 69 are a pair of forwardly-extending threaded rods 75, the forward ends of which extend beyond the front ends of the channels 33, 34. The rods 75 are journalled in brackets 76 secured at the front ends of the channels 33, 34, as by welding, said brackets each having a pair of longitudinally-spaced wall portions 77, 78 received within which is a sprocket 79 threadingly arranged on its associated rod. Welded or otherwise affixed between the lower end portions of the front ends of the channels 33, 34 is a transverse panel 80 carrying a forwardly-projecting bracket 81 having a front wall 82 in spaced parallel relation to said panel. Journalled between the front wall 82 of the bracket 81 and the panel 80 is a sprocket 83 having an axle 84 projecting forwardly of said bracket and terminating in a crank 84a. Also journalled in the transverse panel 80 is an idler sprocket 85, said sprocket and the sprockets 79 and 83 all being in transverse registration and driven in unison by a common sprocket chain 86. The threaded rods 75 are similarly threaded so that when the axle 84 is turned, either manually by use of the crank 84a, or alternatively, by use of a reversible motor (not illustrated), the threaded rods 75 will be moved in unison in the same direction, backwardly or forwardly, carrying along their associated guide plates 69, and thereby moving the crowned roller 65 in one direction or the other in parallelism with the drum drive unit 41.

The belt drive unit 32 also comprises a crowned idler roller 87 and a cylindrical idler roller 88, each removably journalled between the channels 33, 34, said crowned roller being arranged between the crowned tension roller 65 and the drum drive unit 41, and said cylindrical roller being arranged between the lowermost rear corners of said channels.

The belt conveyor system also comprises a pair of end roller units 89, 90 removably fitted at each end of the conveyor framework as illustrated in FIG. 2, each unit comprising a pair of spaced parallel channel plates 91 (only one plate of each unit shown in FIG. 2) between each pair of which is journalled crowned rollers 92, 92a. The channel plates 91 are of the same cross-sectional configuration as that of the mounting channels 33, 34 of the belt drive unit 32, so as to fit slidingly within the conveyor framework, and are removably fixed in position by screws (not illustrated) extending through the undersides of the lower horizontal wall portions 17 of the side frame members 13, 14. The belt conveyor system also comprises one or more (only one shown) idler roller units 93 removably fitted in the conveyor framework between the belt drive unit 32 and the end roller unit 89, said idler roller unit comprising a pair of spaced parallel channel plates 94 (only one plate shown in FIG. 2) between which is journalled a cylindrical roller 95. The channel plates 94 are also of the same cross-sectional configuration as that of the mounting channels 33, 34 of the belt drive unit 32, so as to fit slidingly within the conveyor framework, and are removably fixed in position by screws (not illustrated) extending through the undersides of the lower horizontal wall portions 17 of the side frame members 13, 14.

As illustrated in FIGS. 4 and 5, the lower horizontal wall portions 17 of the side frame members 13 and 14 are provided with openings 96, 97 at each side, respectively, to permit removal of the drum drive unit 41, and openings 98, 99 at each side, respectively, to permit removal of the crowned roller 65 while the belt drive unit 32 is secured in place in the conveyor framework 11. The opening 97 is somewhat enlarged, as shown, to provide additional clearance for passage of the electric cable 59 of the drum drive unit 41.

As illustrated in FIG. 2, the endless belt 12 passes through a slot 100 at the delivery end of the framework table top 22, down and around the crowned roller 92a of the end roller unit 89, over the top of the cylindrical idler roller 95, under the crowned idler roller 87, over and around the cylindrical drum 42, over and around the crowned tension roller 65, under the cylindrical idler roller 88, under and around the crowned roller 92 in the end roller unit 90 and out through a slot 101 at the feed end of the table top 22.

Figure 9:
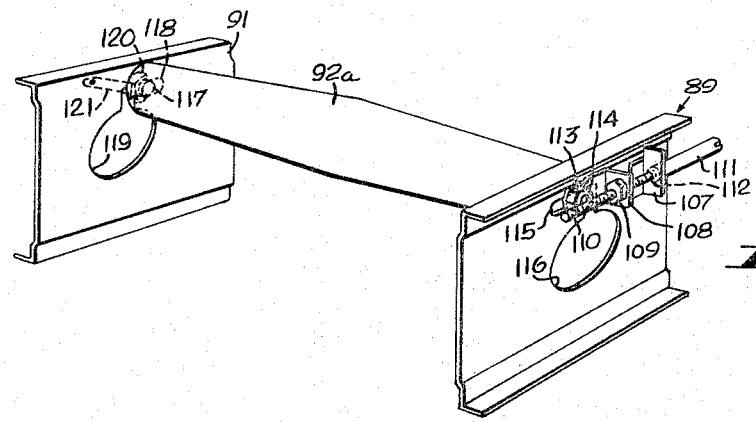
FIG. 9 is a perspective view of the tension roller assembly shown separately.

As is best illustrated in FIG. 9, the end roller unit 89 is provided with means for adjusting the position of one end of its crowned roller axle along the length of the conveyor framework for adjusting the tracking of the conveyor belt. To this end one axle 117 of the crowned roller 92a, fitted with a nut 120, is received within the horizontal portion 118 of a right-angular slot extending downwardly into communication with a round opening 119 through which the roller can pass for its removal for repair or replacement, and is locked in place by a lever 121 pivoted at one end to the outside of the corresponding channel plate. The opposite crowned roller axle 114, fitted with nut 113 extends through the horizontal portion 115 of a right-angular slot extending downwardly into communication with a round opening 116 large enough for the roller to pass through. A right-angular bracket 108 has one arm secured on the roller axle 114 under the nut 113, the other arm having secured thereagainst a nut 109 threadingly-received within which is the threaded end portion 110 of an adjustment rod 111. The outer end of the adjustment rod 111 is of increased diameter to provide an angular face portion 112 which seats against the outside of a bracket 107 fixed to and extending outwardly of the outside of the corresponding channel plate. The outer end of the adjustment rod 111 is slotted, to permit turning by means of a screwdriver inserted through a small hole (not illustrated) at the delivery end of the conveyor. It will be understood that in operation, belt tension resiliently pulls the roller 92a to the left (as illustrated in FIG. 9), causing the adjustment rod 111 to seat against the bracket 107, whereby back and forth longitudinal adjustment of the roller axle 114 in the slot 115 is effected by turning the adjustment rod 111 in one direction or the other.

As illustrated in FIGS. 1 and 2, a control panel 102 is mounted in a housing attached to the underside of the front end of the conveyor framework 11 for starting and stopping the conveyor belt, and for controlling its speed by means of electrical circuitry associated with an electric drive motor 43. Since such motor control circuitry is well known and forms no part of the claimed invention, it is not further described herein. A swingably mounted switch-plate 103 at the delivery end of the conveyor (see FIGS. 1 and 2) is adapted, when pressed down by abutment therewith by a tray or the like object carried by the conveyor belt, to actuate a normally-closed micro-switch 104 located within the conveyor framework 11 and connected in the motor energization circuit to automatically stop the conveyor, if such action is desired.

As illustrated in FIG. 2, a brush 105 within the conveyor framework 11 near the delivery end and bearing upwardly against the outside of the belt at a point just beyond where it enters said framework for its return leg, serves to brush off crumbs and the like, which drop into a tray 106 removably fitted in the framework beneath the brush.

While I have illustrated and described herein only one form in which my invention can conveniently be embodied in practice, it is to be understood that this form is given by way of example only, and not in a limiting sense. My invention, in brief, comprises all the embodiments and modifications coming within the scope and spirit of the following claims.

What I claim as new and desire to secure by Letters Patent is as follows:

1. A belt conveyor comprising, in combination, an elongated framework structure, a table member fixed upon said framework structure and having a substantially flat surface portion, a wide, flat, continuous loop belt having an upper delivery portion slidably seated upon said table member surface portion and a lower return portion extending through slots near such end of said table member surface portion into said framework structure, guide roller means within said framework structure for guiding said belt return portion in its path of travel within said framework structure, and drive mechanism within said framework structure for slidingly driving said belt continuously over said table member surface portion, said drive mechanism comprising a cylindrical drum, an electric motor in said drum, and mechanism interconnecting the output shaft of said motor with said cylindrical drum for rotating said drum with respect to said motor, said guide roller means comprising roller means for training said belt return portion over a greater part of the periphery of said drum for establishing frictional contact therewith, said guide roller means further comprising a pair of crowned end rollers, one near each of said slots for reversing the path of travel of said belt, each of said crowned end rollers being substantially transversely journalled in said framework structure, means for adjusting one journalled end of one of said end rollers along the length of said framework structure for controlling the tracking of said belt along said table member surface portion, a plurality of mutually spaced protrusions extending upwardly in said table member surface portion for reducing sliding friction between said belt and said table member surface portion, and a brush transversely arranged within said housing structure and in brushing engagement with the underside of said belt return portion for brushing away crumbs and the like.

2. A belt conveyor as defined in claim 1 including a tray within said housing member and under said brush for receiving crumbs and the like brushed from the belt.

3. A belt conveyor comprising, in combination, an elongated framework structure, a table member fixed upon said framework structure and having a substantially flat surface portion, a wide, flat, continuous loop belt having an upper delivery portion slidably seated upon said table member surface portion and a lower return portion extending through slots near each end of said table member portion into said framework structure, said framework structure comprising a pair of side frame members, means for guiding and driving said belt return portion in its path of travel within said framework structure, said belt guiding and driving means comprising a belt drive unit removably receivable within said framework structure and slidably adjustable along and between said side frame members, said belt drive unit comprising a cylindrical drum, an electric motor in said drum, and mechanism interconnecting the output shaft of said motor with said cylindrical drum for rotating said drum with respect to said motor, said belt guiding and driving means further comprising roller means for training said belt return portion over the greater part of the periphery of said drum for establishing frictional contact therewith, said frame members being channel shaped and so mutually arranged as to define opposed parallel, longitudinal interior recesses in said framework structure and coextensive therewith, said belt drive unit comprising a pair of spaced, parallel mounting channel members slidably receivable within said interior recesses in said framework structure, said belt guiding and driving means further comprising a pair of end roller units removably receivable within said framework structure and slidably adjustable along and between said side frame members, said end roller units each comprising a transversely journalled end roller adapted to be positioned one each near said slots for reversing the path of travel of said belt, means for independently adjusting one end of one of said end rollers along the length of said framework structure for controlling the tracking of said belt along said table member surface portion, each of said end roller units comprising a crowned roller journalled between a pair of channel plates, said channel plates being slidably receivable within said interior recesses in said framework structure, said belt guiding and driving means further comprising an idler roller unit removably receivable within said framework structure and slidably adjustable along and between said side frame members, said idler roller unit comprising a transversely journalled idler roller adapted to be positioned against the underside of said belt return portion for supporting it at an elevated position, a plurality of mutually spaced protrusions extending upwardly in said table member surface portion for reducing sliding friction between said belt and said table member surface portion, and a brush transversely arranged within said housing structure and in brushing engagement with the underside of said belt return portion for brushing away crumbs and the like.

4. A belt conveyor as defined in claim 3 including a tray within said housing member and under said brush for receiving crumbs and the like brushed from the belt.

References Cited

UNITED STATES PATENTS

| | | | |
|---|---|---|---|
| 416,704 | 12/1889 | Holland | 198—230 X |
| 875,389 | 12/1907 | Theede | 198—208 |
| 1,273,796 | 7/1918 | Bleile | 198—129 X |
| 1,776,419 | 9/1930 | Dodge | 198—208 |
| 2,066,206 | 12/1936 | Lourie | 198—184 |
| 2,074,595 | 3/1937 | Shackelford | 198—203 |
| 2,480,294 | 8/1949 | Hume | 198—208 |
| 2,796,167 | 6/1957 | Thomson | 198—203 |
| 2,973,084 | 2/1961 | Sinden et al. | 198—203 |
| 2,978,069 | 4/1961 | Shoffner | 186—1 |
| 2,997,608 | 8/1961 | Musser. | |
| 3,018,875 | 1/1962 | Greenberger | 198—208 |
| 3,129,804 | 4/1964 | Niekamp | 198—232 X |
| 3,150,768 | 9/1964 | Muller. | |

EVON C. BLUNK, *Primary Examiner.*

M. L. AJEMAN, *Assistant Examiner.*